United States Patent

Reitzle et al.

(10) Patent No.: US 9,203,067 B2
(45) Date of Patent: Dec. 1, 2015

(54) HOUSING FOR A GAS-TIGHT RECHARGEABLE BATTERY

(71) Applicants: Robert Bosch GmbH, Stuttgart (DE); Samsung SDI Co., Ltd., Yongin-si, Gyeonggi-do (KR)

(72) Inventors: Alexander Reitzle, Neu-Ulm (DE); Markus Kohlberger, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 73 days.

(21) Appl. No.: 14/102,351

(22) Filed: Dec. 10, 2013

(65) Prior Publication Data

US 2014/0162092 A1 Jun. 12, 2014

(30) Foreign Application Priority Data

Dec. 12, 2012 (DE) .................. 10 2012 222 836

(51) Int. Cl.
*H01M 2/12* (2006.01)
*H01M 2/34* (2006.01)

(52) U.S. Cl.
CPC .......... *H01M 2/1229* (2013.01); *H01M 2/1276* (2013.01); *H01M 2/345* (2013.01); *H01M 2200/20* (2013.01)

(58) Field of Classification Search
None
See application file for complete search history.

(56) References Cited

U.S. PATENT DOCUMENTS

| 2003/0118892 | A1* | 6/2003 | Ray et al. ........................ 429/82 |
| 2009/0197153 | A1* | 8/2009 | Fujikawa et al. ............... 429/82 |
| 2010/0167107 | A1* | 7/2010 | Byun et al. ...................... 429/56 |
| 2013/0115511 | A1* | 5/2013 | Han et al. ....................... 429/208 |

FOREIGN PATENT DOCUMENTS

| DE | 40 32 990 A1 | 4/1991 |
| EP | 0 711 460 B1 | 3/1997 |

* cited by examiner

*Primary Examiner* — Patrick Ryan
*Assistant Examiner* — Wyatt McConnell
(74) *Attorney, Agent, or Firm* — Maginot, Moore & Beck LLP

(57) ABSTRACT

A housing for a gas-tight rechargeable battery includes a proportional valve that is arranged at an opening in a housing wall. The proportional valve has a valve body that is influenced by force in the direction of its closed position and towards the interior of the housing. The proportional valve is embodied at least partially from metal such that it allows the through-flow of gas if the pressure that is prevailing in the housing exceeds a construction-dependent pressure limit value. The proportional valve is configured to be connected electrically to the cathode of the rechargeable battery. A contact element embodied at least partially from metal is configured to be connected electrically to the anode of the rechargeable battery and is arranged on the outside of the housing such that the valve body comes into physical contact with the contact element after the proportional valve has achieved a defined open position.

12 Claims, 4 Drawing Sheets

HOUSING FOR A GAS-TIGHT RECHARGEABLE BATTERY

This application claims priority under 35 U.S.C. §119 to patent application no. DE 10 2012 222 836.5 filed on Dec. 12, 2012 in Germany, the disclosure of which is incorporated herein by reference in its entirety.

BACKGROUND

Rechargeable batteries are generally equipped with diverse protective devices in order to protect them against electrical damage by way of example during charging or discharging or as a result of a short circuit. In addition, it is known to build weak points into the housing of gas-tight rechargeable batteries, so that in the case of an excess of gas pressure within the housing it is possible to open the housing in a controlled manner and release the gases to reduce the pressure within the housing. If a weak point of this type is triggered, the housing is typically permanently open at the weak point with respect to the environment so that by way of example air, in particular oxygen, and air moisture can penetrate into the housing from outside. This can result in chain reactions, such as by way of example the evaporation of the remaining highly flammable electrolytes or the spontaneous combustion as a result of the carbonate in the electrolyte reacting with air in the case of lithium-ion rechargeable batteries which in the worst case scenario can lead to a fire in the rechargeable battery.

SUMMARY

The object of the disclosure is to provide a novel means of protection, a controlled pressure decrease in the excess gas pressure within the housing of a rechargeable battery and simultaneously to cause the shutdown of the electrochemical function of the rechargeable battery without the housing being open with respect to the environment of the rechargeable battery after using these protective measures.

This object is achieved in each case by means of the combination of features of the disclosure. Advantageous embodiments are disclosed in the dependent claims.

In accordance with a first embodiment, a housing for a gas-tight rechargeable battery is proposed that comprises a proportional valve that is arranged at an opening in a wall of the housing, said proportional valve having a valve body that is influenced by means of force in the direction of its closed position and towards the interior of the housing, is at least in part embodied from metal and can be connected to the cathode of the rechargeable battery in an electrically conductive manner, wherein the proportional valve is embodied in such a manner that in its maximum open position it allows the through-flow of gas if the pressure that is prevailing in the housing exceeds a construction-dependent pressure limit value and wherein a contact element that is at least in part embodied from metal and can be connected to the anode of the rechargeable battery in an electrically conductive manner is arranged on the outer face of the housing in such a manner that the valve body comes into physical contact with the contact element after the proportional valve has achieved a defined open position.

According to this embodiment, as the pressure increases within the housing, the valve body comes into physical contact with the contact element, whereby a short circuit is produced between cathode and anode of the rechargeable battery. This short circuit represents a new current path within the at least one electrochemical cell of the rechargeable battery, which current path prevents the electrochemical decomposition of the electrolyte. After a construction-dependent pressure limit value has been achieved within the housing, the proportional valve allows the through-flow of gas so that gas from the housing can escape from the housing in order to decrease the pressure that is prevailing in the interior of the housing. As a consequence, a rechargeable battery is converted to a safe state in which there is no excess pressure in the interior of the housing that could otherwise lead to various forms of destruction of the rechargeable battery. If the pressure within the housing drops back, the valve body of the proportional valve moves back in the direction of its closed position. First of all, however, the pressure in the housing is again below the construction-dependent pressure limit value, whereby the proportional valve no longer allows the through-flow of gas, so that the interior of the housing and/or the at least one electrochemical cell that is arranged therein is not in contact with the environment of the rechargeable battery. As a consequence, it is possible to prevent the penetration of air moisture, air or other foreign substances into the interior of the housing, whereby it is possible in particular to prevent the build-up of flammable and/or explosive gas mixtures in the interior of the housing, said build-up being caused by means of penetrating air or by means of reaction products with air moisture.

In accordance with an advantageous embodiment, the wall of the housing is embodied at least in part from metal, is connected to the valve body in an electrically conductive manner and can be connected to the cathode of the rechargeable battery in an electrically conductive manner, wherein the contact element is electrically insulated with respect to the wall and the valve body can be connected to the cathode of the rechargeable battery in an electrically conductive manner by way of the wall. This represents a simple possibility for connecting the valve body to the cathode of the rechargeable battery. Owing to the fact that the wall of the housing is connected to the cathode of the rechargeable battery, further protection is provided against corrosion for the wall that is embodied at least in part from metal. This can also be embodied entirely from metal and can be encased by an electrical insulation.

A housing for a gas-tight rechargeable battery is proposed in a second embodiment, which rechargeable battery comprises a proportional valve that is arranged at an opening in a wall of the housing, said proportional valve having a valve body that is influenced by means of force in the direction of its closed position and towards the interior of the housing, wherein the proportional valve is embodied in such a manner that in its maximum open position it allows the through-flow of gas if the pressure that is prevailing in the housing exceeds a construction-dependent pressure limit value, wherein a contact element that is at least in part embodied from metal and can be connected to the anode of the rechargeable battery in an electrically conductive manner is arranged on the exterior face of the housing, wherein a switching element that entirely covers the opening, is at least in part embodied from metal and at least in part embodied in such a manner as to allow the through-flow of gas, can be connected to the cathode of the rechargeable battery in an electrically conductive manner and is connected on its entire circumferential edge to a housing is arranged on the wall in such a manner that the valve body comes into physical contact with the switching element after the proportional valve has achieved a defined open position and as the proportional valve progressively opens, said switching element deforms in such a manner that the switching element comes into physical contact with the contact element.

This second embodiment consequently differs from the above mentioned first embodiment inter alia by virtue of the fact that the valve body cannot be brought into direct contact with the contact element, but rather that a contact of this type is produced by way of the switching element. In addition, in accordance with the second embodiment, it is not necessary for the valve body to be embodied in an electrically conductive manner or for it to be possible to connect said valve body to the cathode of the rechargeable battery. A short circuit is produced between the contact element and the switching element for the abovementioned purpose if the switching element is connected to the cathode of the rechargeable battery in an electrically conductive manner. A bonded connection between the switching element and the contact element is produced or is not produced depending on the choice of material for the switching element. The former is by way of example the case if the switching element is embodied from aluminum. If, however, the switching element is embodied from steel, the switching element and contact element are not connected in a bonded manner. The switching element protects the proportional valve and consequently the housing from outside the housing against penetration of foreign bodies that by way of example could impair the function of the proportional valve, which would otherwise be associated with an inability of a corresponding protective device for a rechargeable battery to function. The gas that is flowing through the proportional valve after a construction-dependent pressure limit value has been exceeded can, however, owing to the switching element allowing the through-flow of gas, escape through said switching element from the housing until the desired pressure reduction in the interior of the housing has been achieved. After this protection device has been triggered in accordance with the second embodiment, the switching element can return to its state in which it is not in contact with the valve body. On the other hand, it is also possible that the deformation of the switching element and the movement of the valve body are coupled to one another in each state of the protective device.

According to an advantageous embodiment of the disclosure, the wall of the housing is embodied at least in part from metal, is connected to the switching element in an electrically conductive manner and can be connected to the cathode of the rechargeable battery in an electrically conductive manner, wherein the contact element is electrically insulated with respect to the wall and the switching element can be connected to the cathode of the rechargeable battery in an electrically conductive manner by way of the wall. This represents a simple possibility for connecting the switching element to the cathode of the rechargeable battery without the need to use additional components for this purpose.

A further advantageous embodiment provides that the switching element comprises at least one opening through which gas can flow. The gas that is escaping from the interior of the housing by way of the proportional valve can escape through the opening through which gas can flow. The number and size of the openings through which gas can flow on the switching element can be tailored to suit the respective circumstances and requirements.

In the case of a closed proportional valve, the opening through which gas can flow is preferably closed in a gas-tight manner by means of a protective foil that is arranged on the switching element and is at least in part destroyed or detached from the switching element as the switching element is influenced by pressure and/or as the switching element is deformed whilst at least partially revealing the opening through which gas can flow. As a consequence, it is achieved that the opening through which gas can flow when said opening is in its starting state in which there is no damaging pressure increase within the housing of the rechargeable battery is completely closed, preventing the through-flow of gas, whereby it is possible to prevent the penetration of gases and/or foreign bodies. This serves to increase the reliability of this protective device for a rechargeable battery in accordance with the second embodiment.

Alternatively, it can be provided that a mesh, knitted fabric, net or sieve being gas-permeable and extending over the entire opening through which gas can flow is arranged on the switching element. The switching element is consequently embodied in such a manner as to allow the through-flow of gas; however, it can effectively prevent foreign bodies from passing through the switching element and arriving at the proportional valve and disrupting its function.

In a third embodiment, a housing for a gas-tight rechargeable battery is proposed, which rechargeable battery comprises a proportional valve that is arranged at an opening in a wall of the housing, said proportional valve having a valve body that is influenced by means of force in the direction of its closed position and towards the interior of the housing, wherein the proportional valve is embodied in such a manner that in its maximum open position it allows the through-flow of gas if the pressure that is prevailing in the housing exceeds a construction-dependent pressure limit value, wherein a contact element that is at least in part embodied from metal and can be connected to the anode of the rechargeable battery in an electrically conductive manner is arranged on the exterior face of the housing, wherein a switching element that is at least in part embodied from metal and is embodied in such a manner as not to allow the through-flow of gas, entirely covers the opening in the case of a closed proportional valve, can be connected to the cathode of the rechargeable battery in an electrically conductive manner and is connected on a part of its circumferential edge to the housing is arranged on the wall in such a manner that the valve body comes into physical contact with the switching element after the proportional valve has achieved a defined open position and, as the proportional valve progressively opens whilst partially revealing the opening in the wall of the housing, deforms said switching element in such a manner that the switching element comes into physical contact with the contact element.

Also in the case of this third embodiment, in contrast to the abovementioned first embodiment, a switching element is provided in addition but in contrast to the second embodiment this switching element is embodied in such a manner as not to allow the through-flow of gas and is only connected on a part of its circumferential edge to the housing. The deformation of the switching element that occurs as a result of said switching element contacting the valve body is preferably in an elastic manner in the form of the switching element bending. In this case, the part of the circumferential edge of the switching element, by way of which the switching element is connected to the wall of the housing, can function in the manner of an articulated joint. Alternatively, a separate articulated joint could also be provided. The protective device for a rechargeable battery in accordance with the third embodiment comprises, in contrast to the first embodiment, increased protection against the penetration of foreign bodies or damaging gases from outside by way of the proportional valve into the interior of the housing, said protection being greater than that provided by the second embodiment.

The wall of the housing is advantageously embodied at least in part from metal, is connected to the switching element in an electrically conductive manner and can be connected to the cathode of the rechargeable battery in an electrically conductive manner, wherein the contact element is electrically insulated with respect to the wall and the switching element can be connected to the cathode of the rechargeable battery in an electrically conductive manner by way of the wall. This represents a simple possibility for producing an electrically conductive connection between the switching element and the cathode of the rechargeable battery.

In accordance with a further advantageous embodiment, the valve body comprises a contact protrusion on its face that is remote from the interior of the housing. The length of the contact protrusion by way of which the valve body comes into physical contact with the contact element and/or the switching element can be varied to tailor the protective device for a rechargeable battery to suit the most varied constructive conditions without having to incorporate complex constructive changes to the housing for this purpose.

In addition, it is proposed that the valve body is influenced by means of force by means of a pressure spring in the direction of its closed position. An embodiment of this type of the proportional valve is technically simple to achieve.

The disclosure further proposes a rechargeable battery that comprises a housing in accordance with one of the above described embodiments or in accordance with a user-defined combination thereof. The abovementioned advantages are consequently incorporated.

BRIEF DESCRIPTION OF THE DRAWINGS

The disclosure is further described hereinunder with reference to the attached figures. In the drawings.

DETAILED DESCRIPTION

Figure 1A:
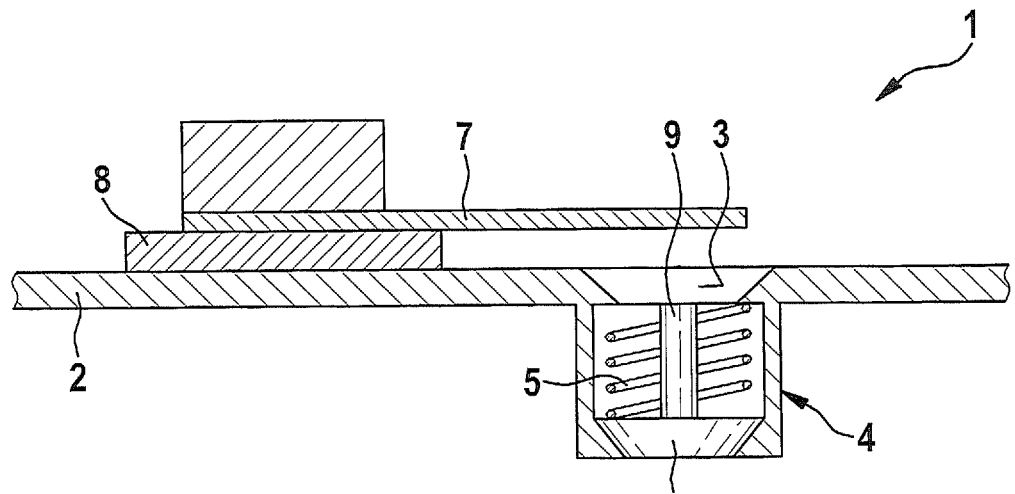
FIG. 1a: illustrates a side view of a first exemplary embodiment for the housing in accordance with the disclosure in an unloaded state.
Figure 1B:
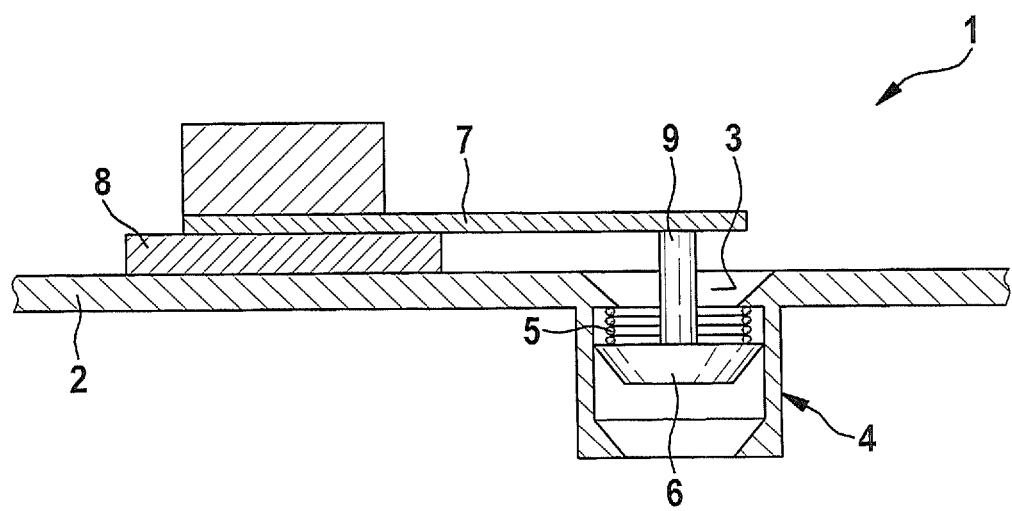
FIG. 1b: illustrates in the loaded state the exemplary embodiment that is illustrated in FIG. 1a, FIG. 2a: illustrates a side view of a second exemplary embodiment for the housing in accordance with the disclosure in an unloaded state.

FIG. 1a illustrates a side view of a first embodiment of the housing 1 in accordance with the disclosure, wherein only a section of the wall 2 of the housing 1 is illustrated, said wall being embodied from metal, on which the opening 3 is embodied, on which a proportional valve 4 is arranged. The proportional valve 4 comprises a valve body 6 that is embodied from metal and influenced by means of force by way of a pressure spring 5 in the direction of its closed position and towards the interior of the housing 1 that lies below the wall 2 in FIG. 1a, which valve body is in its closed position in FIG. 1a. The proportional valve 4 is embodied in such a manner that in its maximum open position, as illustrated in FIG. 1b, it allows the through-flow of gas if the pressure that is prevailing in the housing 1 exceeds a construction-dependent pressure limit value. A contact element 7 that is embodied from metal and can be connected to the anode, not illustrated, of the rechargeable battery in an electrically conductive manner is arranged on the exterior face of the wall 2. The wall 2 is connected to the valve body 6 in an electrically conductive manner. The valve body 6 can be connected to the cathode of the rechargeable battery in an electrically conductive manner by means of an electrically conductive connection of the wall 2 to the cathode of the rechargeable battery. The contact element 7 is electrically insulated with respect to the wall 2 by way of an insulating body 8. The valve body 6 comprises a contact protrusion 9 on its face that is remote from the interior of the housing 1. FIG. 1a illustrates the housing 1 during normal operation, in other words in a state in which the housing 1 is not loaded with a damaging excess pressure that is prevailing in its interior.

The first embodiment for the housing 1 in accordance with the disclosure that is illustrated in FIG. 1a is illustrated in FIG. 1b in a state in which a damaging excess pressure is prevailing in the interior of the housing 1. The proportional valve 4 has been moved into its maximum open position by means of the excess pressure that is prevailing in the interior of the housing 1, in which open position the contact protrusion 9 of the valve body 6 comes into physical contact with the contact element 7. If the pressure in the interior of the housing 1 further increases, the proportional valve 4 allows the through-flow of gas so that gas can escape past the valve body 6 and through the opening 3 in the wall 2 out of the housing 1. If the pressure drops back to below the construction-dependent pressure limit value, below which pressure limit the proportional valve 4 allows the through-flow of gas, the proportional valve 4 again does not allow the through-flow of gas. In the case of an additional drop in pressure in the interior of the housing 1, the valve body 6 returns into its position that is illustrated in FIG. 1a.

Figure 2A:
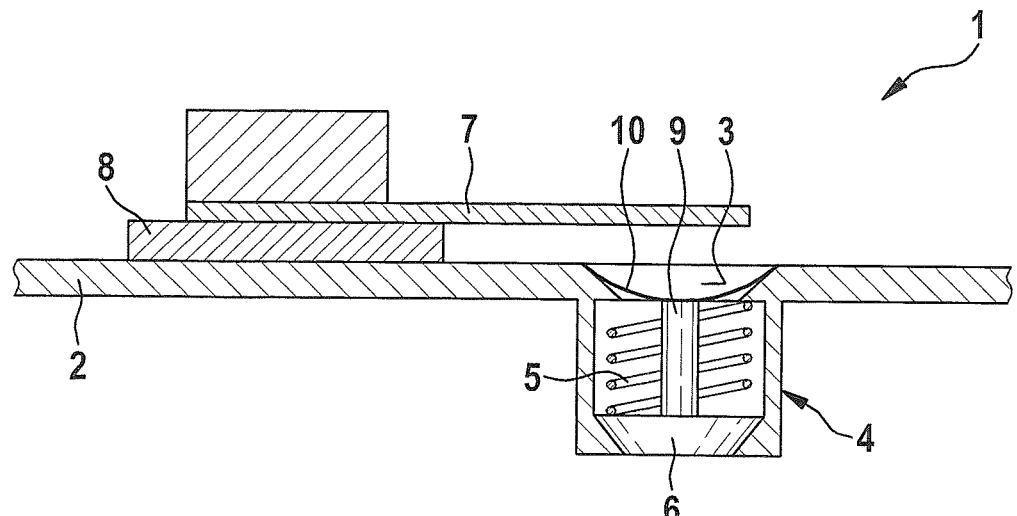
FIG. 2b: illustrates in the loaded state the exemplary embodiment that is illustrated in FIG. 2b, FIG. 3a: illustrates a side view of a third exemplary embodiment for the housing in accordance with the disclosure in an unloaded state.
Figure 4:
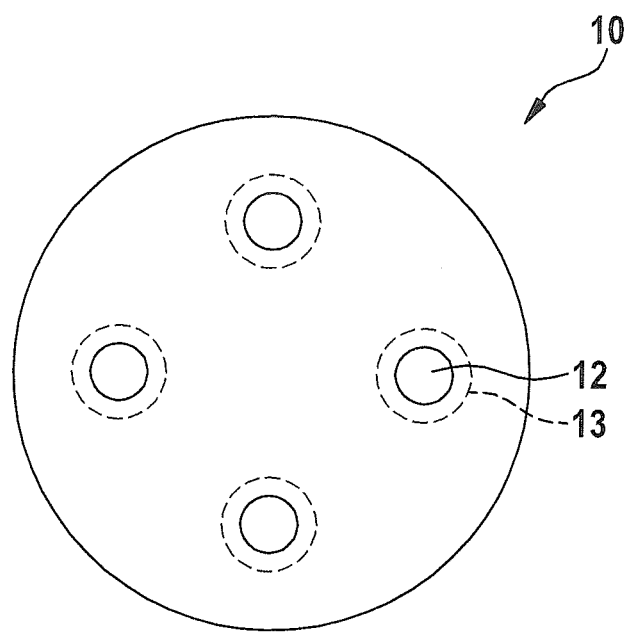

FIG. 2a illustrates a second embodiment of the housing 1 in accordance with the disclosure, wherein in contrast to the first embodiment that is illustrated in the FIGS. 1a and 1b, a switching element 10 that entirely covers the opening 3, is embodied from metal and is embodied in part in such a manner as to allow the through-flow of gas, can be connected to the cathode of the rechargeable battery in an electrically conductive manner and is connected on its entire circumferential edge to the wall 2 is arranged on the wall 2. The switching element 10 is embodied from an aluminum foil, of which a plan view is illustrated in FIG. 4. The switching element 10 is curved in the direction of the valve body 6 in the unloaded starting state of the housing.

Figure 2B:
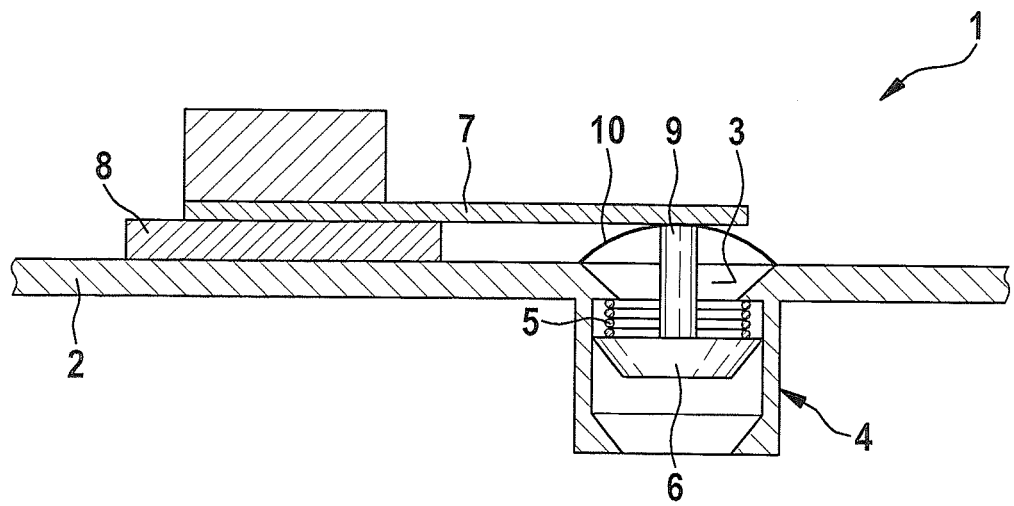

The embodiment that is illustrated in FIG. 2a for the housing 1 in accordance with the disclosure is illustrated in FIG. 2b in a state in which a damaging excess pressure prevails in the interior of the housing 1. As a consequence, the valve body is displaced in the direction of the contact element 7 corresponding with FIG. 1b until the proportional valve 4 achieves its maximum open position. If the pressure in the interior of the housing 1 increases to above a construction-dependent pressure limit value, the proportional valve 4 allows the through-flow of gas, in other words gas can flow past the valve body 6. The gas that is flowing past the valve body 6 can finally escape from the housing 1 through the switching element 10 since this is embodied in such a manner as to allow the through-flow of gas. After the proportional valve 4 has achieved a defined open position, the valve body 6 comes into physical contact with the switching element 10 by way of its contact protrusion 9. As the proportional valve 4 continues to progressively open, the switching element 10 is consequently deformed in such a manner that said switching element comes into physical contact with the contact element 7, as is illustrated in FIG. 2b.

Figure 3A:
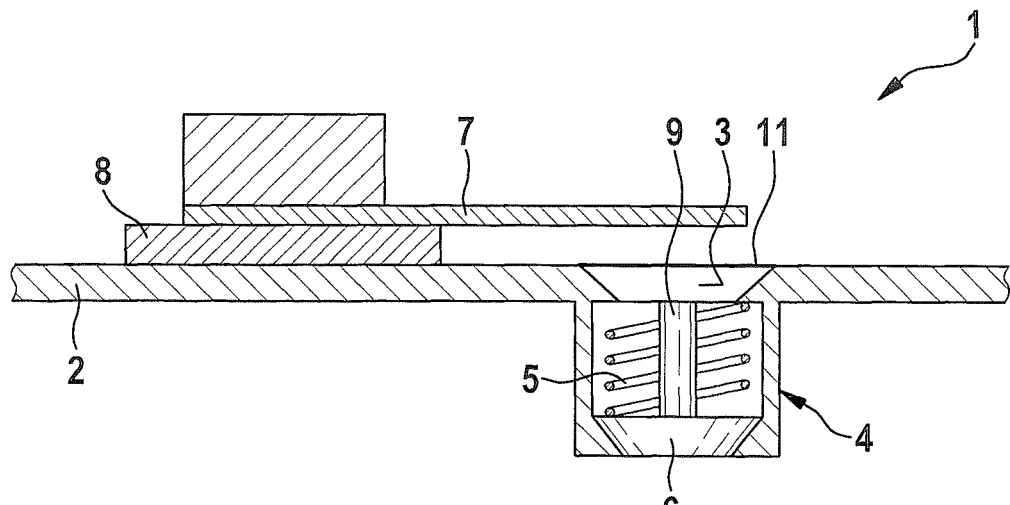
FIG. 3b: illustrates in a loaded state the exemplary embodiment that is illustrated in FIG. 3a, and FIG. 4: illustrates a plan view of an exemplary embodiment for the switching element that is illustrated in the FIGS. 2a and 2b.

FIG. 3a illustrates a third embodiment for the housing 1 in accordance with the disclosure that likewise differs from the first embodiment that is illustrated in the FIGS. 1a and 1b by virtue of the additional arrangement of a switching element 11. In contrast to the embodiment that is illustrated in FIGS. 2a and 2b the switching element 11 is embodied in such a manner so as not to allow the through-flow of gas and is only connected on a part of its circumferential edge to the wall 2 of the housing 1. A state is illustrated in FIG. 3a in which there is no damaging excess pressure prevailing in the interior of the housing 1. In this state, the proportional valve 4 is closed so that the switching element 11 covers the opening 3 entirely.

Figure 3B:
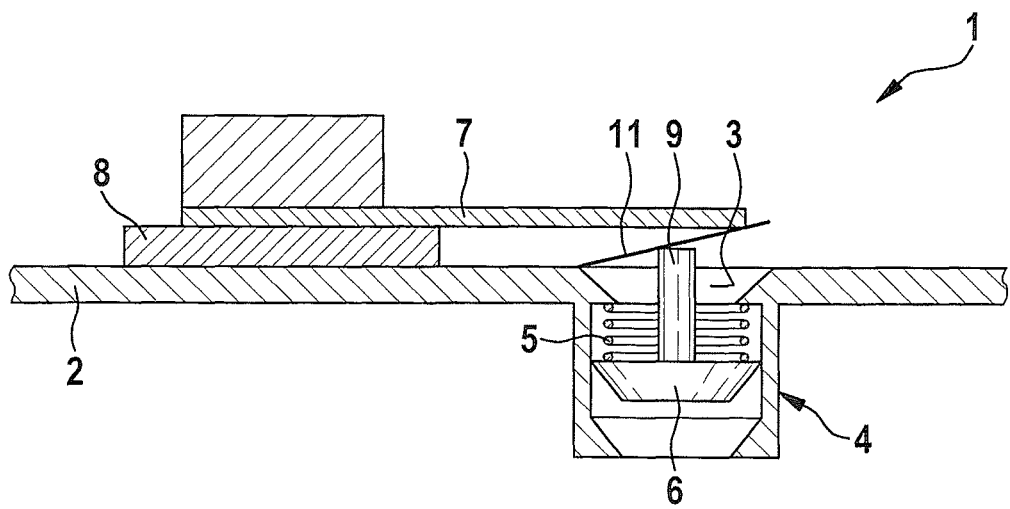

The embodiment of the housing 1 in accordance with the disclosure that is illustrated in FIG. 3a is illustrated in FIG. 3b in a state in which a damaging excess pressure is prevailing in the interior of the housing 1. As a consequence, the valve body 6 is displaced into its maximum open position. If, in the case of this maximum open position of the proportional valve 4, the pressure in the interior of the housing 1 increases to above a construction defined pressure limit value, the proportional valve 4 allows the through-flow of gas so that gas flows out of the interior of the housing 1 past the valve body 6. The switching element 11 is deformed in the region of the part of the circumferential edge by means of the contact of the switching element 11 with the contact protrusion 9 of the valve body 6, by way of which the switching element 11 is connected to the wall 2 in an electrically conductive manner. The opening 3 in the wall 2 of the housing 1 is partially revealed by means of this deformation of the switching element 11, so that gas that is flowing past the valve body 6 can escape from the housing 1. If the switching element 11 is embodied by way of example from aluminum, the switching element 11 does not return to its starting position that is illustrated in FIG. 3a after producing a short circuit by way of contacting with the contact element 7, since it leads to a bonded connection between the contact element 7 and the switching element 11 on its contact points. If, however, a switching element 11 that is embodied from steel is used, the resulting temperature in the case of a short circuit is not sufficient in order to produce a bonded connection between switching element 11 and contact body 7. A switching element that is embodied from steel therefore would be able to return to its starting position that is illustrated in FIG. 3a in the case of decreasing pressure in the interior of the housing 1.

FIG. 4 illustrates a plan view of the switching element 10 that is illustrated in FIGS. 2a and 2b. The switching element 10 comprises four openings that allow the through-flow of gas 12. Each opening that allows a through-flow of gas 12 is closed in a gas-tight manner by means of a protective foil 13 that is arranged on the switching element 10. These protective foils 13 are at least in part destroyed or detached from the switching element 10 in the case of the switching element 10 being influenced by pressure and/or in the case of the deformation of the switching element 10 corresponding to FIG. 2b whilst at least partially revealing the openings through which gas can flow 12 in order to render possible the passage of gas through the switching element 10.

What is claimed is:

1. A housing for a gas-tight rechargeable battery, comprising:
   a proportional valve arranged at an opening in a wall of the housing, the proportional valve movable between a maximum open position and a normally closed position, the proportional valve having a valve body influenced by force in the direction of the closed position and towards the interior of the housing, the proportional valve being at least in part embodied from metal and configured to be connected to the cathode of the rechargeable battery in an electrically conductive manner; and
   a contact element being at least in part embodied from metal and configured to be connected to the anode of the rechargeable battery in an electrically conductive manner,
   wherein the proportional valve is configured such that in the maximum open position it allows the gas to escape from the housing if the pressure that is prevailing in the housing exceeds a construction-dependent pressure limit value until the pressure that is prevailing in the housing no longer exceeds the construction-dependent pressure limit value, and
   wherein the contact element is arranged on the outside of the housing in such a manner that the valve body comes into physical contact with the contact element after the proportional valve has achieved a defined open position.

2. The housing according to claim 1, wherein the wall is at least in part embodied from metal, is connected to the valve body in an electrically conductive manner, and is configured to be connected to the cathode of the rechargeable battery in an electrically conductive manner, and wherein the contact element is electrically insulated with respect to the wall and the valve body is configured to be connected to the cathode of the rechargeable battery in an electrically conductive manner by way of the wall.

3. A housing for a gas-tight rechargeable battery, comprising:
   a proportional valve arranged at an opening in a wall of the housing, the proportional valve having a valve body influenced by force in the direction of its closed position and towards the interior of the housing, the proportional valve being embodied in such a manner that in its maximum open position it allows the through-flow of gas if the pressure that is prevailing in the housing exceeds a construction-dependent pressure limit value;
   a contact element being at least in part embodied from metal and configured to be connected to the anode of the rechargeable battery in an electrically conductive manner, the contact element being arranged on the exterior face of the housing; and
   a switching element that entirely covers the opening, the switching element being at least in part embodied from metal and embodied at least in part so as to allow the through-flow of gas, the switching element being configured to be connected to the cathode of the rechargeable battery in an electrically conductive manner and being connected on its entire circumferential edge to the wall,
   wherein the switching element is arranged on the wall in such a manner that the valve body comes into physical contact with the switching element after the proportional valve has achieved a defined open position and as the proportional valve progressively opens said switching element deforms in such a manner that the switching element comes into physical contact with the contact element.

4. The housing according to claim 3, wherein the wall is at least in part embodied from metal, is connected to the switching element in an electrically conductive manner, and is configured to be connected to the cathode of the rechargeable battery in an electrically conductive manner, and wherein the contact element is electrically insulated with respect to the wall and the switching element is configured to be connected to the cathode of the rechargeable battery by way of the wall in an electrically conductive manner.

5. The housing according to claim 3, wherein the switching element comprises at least one opening through which gas is configured to flow.

6. The housing according to claim 5, wherein, in the case of the closed proportional valve, the opening through which gas is configured to flow is closed in a gas-tight manner by a protective foil arranged on the switching element, the protective foil being at least in part destroyed or detached from the switching element in one or more of the case of the switching element being influenced by pressure and the case of the deformation of the switching element whilst at least partially revealing the opening through which gas is configured to flow.

7. The housing according to claim 5, wherein a mesh, knitted fabric, net or sieve being permeable and extending over the entire opening through which gas is configured to flow is arranged on the switching element.

8. A housing for a gas-tight rechargeable battery, comprising:
- a proportional valve arranged at an opening in a wall of the housing, the proportional valve having a valve body influenced by force in the direction of its closed position and towards the interior of the housing, the proportional valve being embodied in such a manner that in its maximum open position it allows the through-flow of gas if the pressure that is prevailing in the housing exceeds a construction-dependent pressure limit value;
- a contact element being embodied at least in part from metal and configured be connected to the anode of the rechargeable battery in an electrically conductive manner, the contact element being arranged on the exterior face of the housing; and
- a switching element that (i) entirely covers the opening when the proportional valve is closed, (ii) is at least in part metal, and (iii) is embodied at least in part in such a manner as not to allow the through-flow of gas, is configured to be connected to the cathode of the rechargeable battery in an electrically conductive manner and is connected on a part of its circumferential edge to the wall,
- wherein the switching element is arranged on the wall in such a manner that the valve body comes into physical contact with the switching element after the proportional valve has achieved a defined open position and, as the proportional valve progressively opens whilst partially revealing the opening in the wall, deforms said switching element in such a manner that the switching element comes into physical contact with the contact element.

9. The housing according to claim 8, wherein the wall is at least in part embodied from metal, is connected to the switching element in an electrically conductive manner, and is configured to be connected to the cathode of the rechargeable battery in an electrically conductive manner, and wherein the contact element is electrically insulated with respect to the wall and the switching element is configured to be connected to the cathode of the rechargeable battery in an electrically conductive manner by way of the wall.

10. The housing according to claim 1, wherein the valve body comprises a contact protrusion on its face that is remote from the interior of the housing.

11. The housing according to claim 1, wherein the valve body is influenced by force by a pressure spring in the direction of its closed position.

12. The housing according to claim 1, wherein the housing is included in a rechargeable battery.

* * * * *